US012628194B2

(12) United States Patent
Takahashi et al.

(10) Patent No.: US 12,628,194 B2
(45) Date of Patent: May 12, 2026

(54) TERMINAL

(71) Applicant: NTT DOCOMO, INC., Tokyo (JP)

(72) Inventors: Yuki Takahashi, Tokyo (JP); Shinya Kumagai, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 379 days.

(21) Appl. No.: 18/247,358

(22) PCT Filed: Oct. 9, 2020

(86) PCT No.: PCT/JP2020/038379
§ 371 (c)(1),
(2) Date: Mar. 30, 2023

(87) PCT Pub. No.: WO2022/074843
PCT Pub. Date: Apr. 14, 2022

(65) Prior Publication Data
US 2023/0397243 A1 Dec. 7, 2023

(51) Int. Cl.
*H04W 72/56* (2023.01)
*H04W 72/1268* (2023.01)
*H04W 72/02* (2009.01)
*H04W 72/21* (2023.01)
*H04W 72/51* (2023.01)

(52) U.S. Cl.
CPC ....... *H04W 72/56* (2023.01); *H04W 72/1268* (2013.01)

(58) Field of Classification Search
CPC ............. H04W 72/56; H04W 72/1268; H04W 72/566; H04W 72/02; H04W 72/21; H04W 72/51
See application file for complete search history.

(56) References Cited

U.S. PATENT DOCUMENTS 11,910,382 B2 * 2/2024 Wang ................ H04W 72/1268
12,381,704 B2 * 8/2025 Lim .......................... H04L 5/16
(Continued)

FOREIGN PATENT DOCUMENTS

WO 2020/032753 A1 2/2020

OTHER PUBLICATIONS

International Search Report issued in PCT/JP2020/038379 on May 18, 2021 (3 pages).
(Continued)

*Primary Examiner* — Joseph E Dean, Jr.

(74) *Attorney, Agent, or Firm* — Osha Bergman Watanabe & Burton LLP

(57) ABSTRACT

A terminal comprising: a communication unit that performs a transmission of an uplink signal using two or more uplink channels with different priorities; and a control unit that performs a multiplexing control on a multiplexing of two or more uplink channels when a multiplexing timeline condition on the multiplexing of two or more uplink channels is satisfied, and performs a prioritization control on a prioritization of two or more uplink channels when a prioritization timeline condition on the prioritization of two or more uplink channels is satisfied; wherein the control unit determines whether or not the prioritization timeline condition is satisfied, after determining whether or not the multiplexing timeline condition is satisfied.

4 Claims, 13 Drawing Sheets

(56) References Cited

U.S. PATENT DOCUMENTS

| | | | | |
|---|---|---|---|---|
| 2020/0296716 A1* | 9/2020 | Lin | .................... | H04W 72/21 |
| 2020/0344332 A1 | 10/2020 | Yang et al. | | |
| 2022/0394707 A1* | 12/2022 | Chen | .................. | H04L 5/0053 |
| 2023/0064087 A1* | 3/2023 | Yin | .................... | H04L 1/1854 |

OTHER PUBLICATIONS

Written Opinion of the International Searching Authority issued in PCT/JP2020/038379 on May 18, 2021 (4 pages).
Sharp; "Enhancements on intra-UE multiplexing and prioritization"; 3GPP TSG RAN WG1 #102-e, R1-2006575; e-3 Meeting; Aug. 17-28, 2020 (3 pages).
Nokia, Nokia Shanghai Bell; "Revised WID: Enhanced Industrial Internet of Things (IoT) and ultra-reliable and low 4 latency communication (URLLC) support for NR"; 3GPP TSG RAN Meeting #88e, RP-201310; Electronic meeting; Jun. 29-Jul. 3, 2020 (6 pages).
Office Action issued in Chinese Application No. 202080105295.2, dated Jul. 9, 2024 (19 pages).
Office Action issued in Japanese Application No. 2022-555246, dated Aug. 6, 2024 (12 pages).

\* cited by examiner

Case 1

$N_1+d_{1,1}$ symbols(#1) $S_0$ $N_2+d_{2,1}+d_1$ symbols

⬚...DCI ▤...PDSCH ▥...PUCCH(LP) ▦...PUCCH(HP)

Case 2

$N_1+d_{1,1}$ symbols(#2)

$N_1+d_{1,1}$ symbols(#1)

$S_0$ $N_2+d_{2,1}+d_2$ symbols

⬚...DCI ▤...PDSCH ▥...PUCCH(LP) ▦...PUCCH(HP)

Case 3

$N_2+d_{2,1}+d_1$ symbols $N_1+d_{1,1}+1$ symbols(#1)    $S_0$ $N_2+d_{2,1}+d_2$ symbols(#2)

◨···DCI    ▤···PDSCH    ▥···PUCCH(LP)    ▨···PUSCH(HP)

Case 4

$N_2+d_{2,1}+d_1$ symbols $N_2+d_{2,1}+1$ symbols(#1)    $S_0$ $N_1+d_{1,1}+1$ symbols(#2)

◨···DCI    ▤···PDSCH    ▨···PUSCH(LP)    ▦···PUCCH(HP)

CONTROL EXAMPLE 1-1

CONTROL EXAMPLE 1-2

CONTROL EXAMPLE 2-1

CONTROL EXAMPLE 2-2

CONTROL EXAMPLE 2-3

CONTROL EXAMPLE 3-1

CONTROL EXAMPLE 3-2

TERMINAL

TECHNICAL FIELD

The present disclosure relates to terminals that perform radio communication, in particular, terminals that perform radio communication using two or more uplink channels with different priorities.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

Release 15 of 3GPP supports multiplexing of two or more uplink channels (PUCCH (Physical Uplink Control Channel) and PUSCH (Physical Uplink Shared Channel)) transmitted in the same slot. In the multiplexing of the uplink channel, the multiplexing timeline condition that the time between the reception of the DCI and the transmission of the uplink channel must satisfy is prescribed.

Release 16 (NR) of 3GPP supports the prioritization of two or more uplink channels transmitted in the same slot. In the prioritization of the uplink channel, a prioritization timeline condition is defined that the time between the reception of the DCI and the transmission of the uplink channel must meet.

In addition, Release 17 of 3GPP agreed to support multiplexing of the uplink channels with different priorities (For example, Non-Patent Literature 1).

CITATION LIST

Non-Patent Literature

Non-Patent Literature 1 "Enhanced Industrial Internet of Things (IoT) and ultra-reliable and low latency communication," RP-201310, 3GPP TSG PAN Meeting #86 e, 3GPP, July 2020

SUMMARY OF INVENTION

Against this background, the inventors have found, after careful consideration, that a case can be assumed in which the priority timeline condition is satisfied but the multiple timeline condition is not. In other words, the inventors have found that they are unable to perform adequate control over multiplexing and prioritization when assuming multiplexing of uplink channels with different priorities.

Therefore, the following disclosure has been made in view of this situation, and the purpose is to provide a terminal that can appropriately control multiplexing and prioritization of uplink channels with different priorities.

An aspect of this disclosure is a terminal comprising: a communication unit that performs a transmission of an uplink signal using two or more uplink channels with different priorities; and a control unit that performs a multiplexing control on a multiplexing of two or more uplink channels when a multiplexing timeline condition on the multiplexing of two or more uplink channels is satisfied, and performs a prioritization control on a prioritization of two or more uplink channels when a prioritization timeline condition on the prioritization of two or more uplink channels is satisfied; wherein the control unit determines whether or not the prioritization timeline condition is satisfied, after determining whether or not the multiplexing timeline condition is satisfied.

MODES FOR CARRYING OUT THE INVENTION

Figure 1:
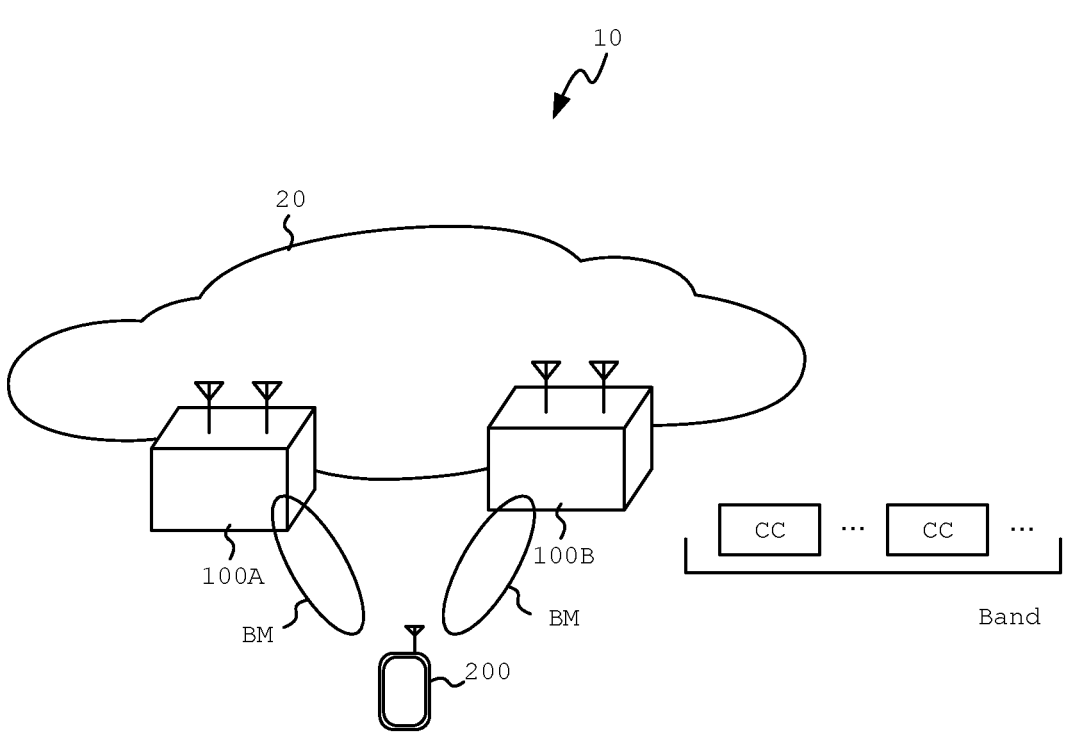
FIG. 1 is an overall schematic diagram of radio communication system 10.

Exemplary embodiments of the present invention are explained below with reference to the accompanying drawings. Note that, the same or similar reference numerals have been attached to the same functions and configurations, and the description thereof is appropriately omitted.

Embodiment

(1) Overall Schematic Configuration of the Radio Communication System

FIG. 1 is an overall schematic diagram of a radio communication system 10 according to the embodiment. The radio communication system 10 is a radio communication system according to 5G New Radio (NR) and includes a Next Generation-Radio Access Network 20 (herein below referred to as NG-RAN 20) and a terminal 200 (herein below referred to as UE 200).

The radio communication system 10 may be a radio communication system according to a scheme called Beyond 5G, 5G Evolution or 6G.

The NG-RAN 20 includes a radio base station 100A (herein below referred to as gNB 100A) and a radio base station 100B (herein below referred to as gNB 100B). The specific configuration of radio communication system 10 including the number of gNBs and UEs is not limited to the example shown in FIG. 1.

The NG-RAN 20 actually includes multiple NG-RAN nodes, specifically, gNBs (or ng-eNBs), and is connected to a core network (5GC, not shown) according to 5G. Note that NG-RAN 20 and 5GC may simply be described as "network."

The gNB 100A and gNB 100B are radio base stations in accordance with 5G and perform radio communication in accordance with UE 200 and 5G. By controlling radio signals transmitted from multiple antenna elements, gNB 100A, gNB 100B and UE 200 can support Massive MIMO (Multiple-Input Multiple-Output) for generating more directional beam BM, carrier aggregation (CA) using multiple component carriers (CCs) bundled together, and dual connectivity (DC) for simultaneous communication between UE and each of two NG-RAN nodes. The DC may include MR-DC (Multi-RAT Dual Connectivity) using MCG (Master Cell Group) and SCG (Secondary Cell Group). Examples of MR-DC include EN-DC (E-UTRA-NR Dual Connectivity), NE-DC (NR-EUTRA Dual Connectivity) and NR-DC (NR-NR Dual Connectivity). Here, CC (cell) used in CA may be considered to constitute the same cell group. MCG and SCG may be considered to constitute the same cell group.

Figure 2:
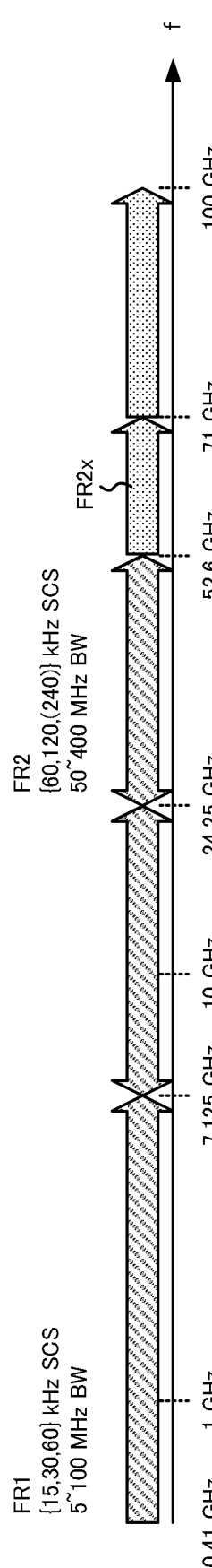
FIG. 2 is a diagram showing the frequency range used in radio communication system 10.

The radio communication system 10 also supports multiple frequency ranges (FRs). FIG. 2 shows the frequency range used in radio communication system 10.

As shown in FIG. 2, radio communication system 10 corresponds to FR1 and FR2. The frequency bands of each FR are as follows:

FR 1: 410 MHz to 7.125 GHz

FR 2: 24.25 GHz to 52.6 GHz

FR 1 uses sub-carrier spacing (SCS) of 15, 30 or 60 kHz and may use a bandwidth (BW) of 5~100 MHz. FR 2 is a higher frequency than FR 1 and an SCS of 60 or 120 kHz (240 kHz may be included) may be used and a bandwidth (BW) of 50~400 MHz may be used.

SCS may be interpreted as numerology. Numerology is defined in 3GPP TS 38.300 and corresponds to one subcarrier interval in the frequency domain.

In addition, the radio communication system 10 corresponds to a higher frequency band than that of FR 2. Specifically, the radio communication system 10 corresponds to a frequency band above 52.6 GHz and up to 114.25 GHz. Such a high frequency band may be referred to as "FR 2×" for convenience.

To solve such problems, Cyclic Prefix-Orthologous Frequency Division Multiplexing (CP-OFDM)/Discrete Fourier Transform-Spread (DFT-S-OFDM) with larger Sub-Carrier Spacing (SCS) may be applied when using a band exceeding 52.6 GHz.

Figure 3:
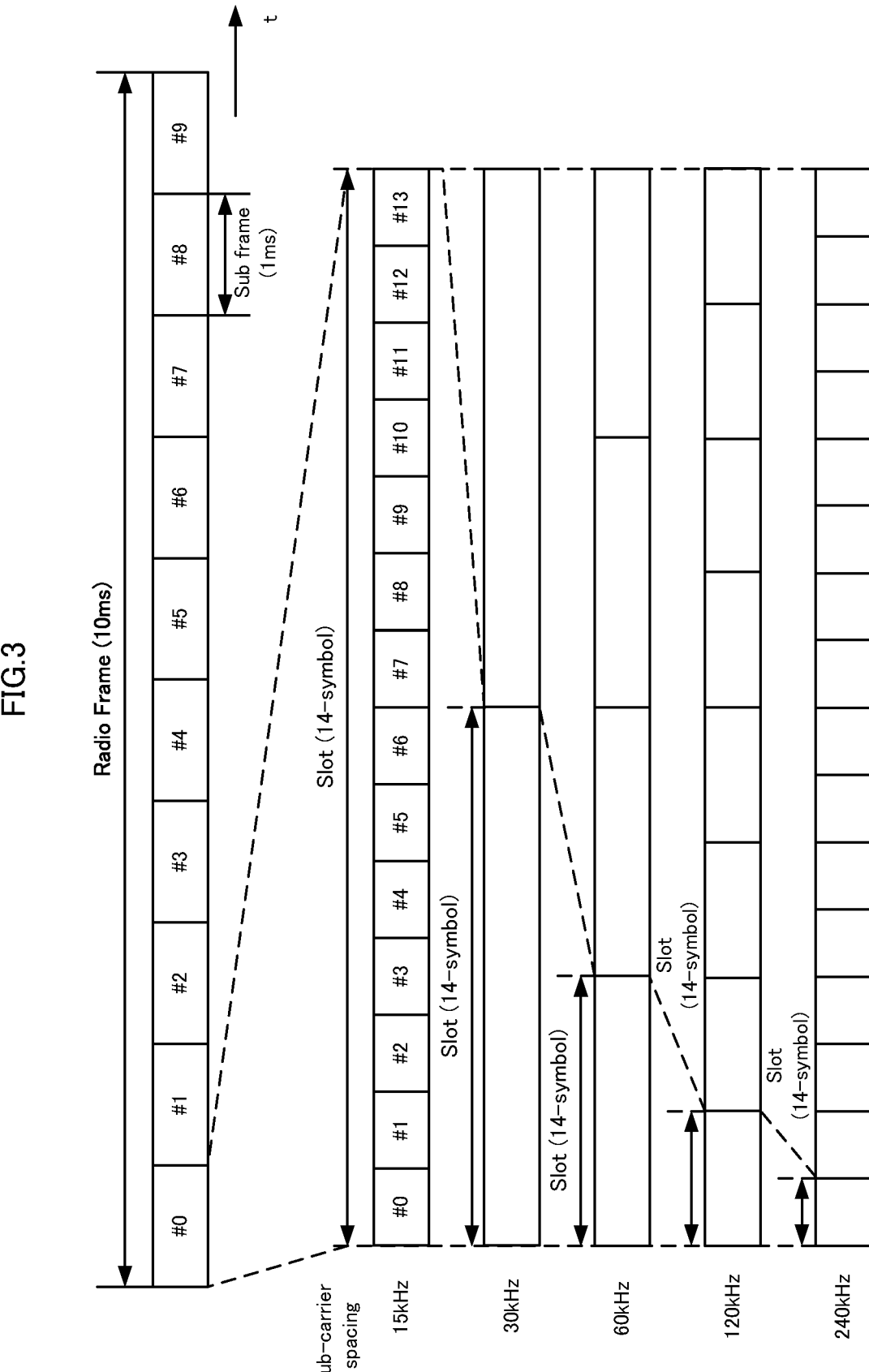
FIG. 3 is a diagram showing an example configuration of the radio frame, subframe and slot used in radio communication system 10.

FIG. 3 shows an example configuration of the radio frame, subframe and slot used in radio communication system 10.

As shown in FIG. 3, one slot consists of 14 symbols, and the larger (wider) the SCS, the shorter the symbol period (and slot period). The SCS is not limited to the interval (frequency) shown in FIG. 3. For example, 480 kHz, 960 kHz, etc., may be used.

In addition, the number of symbols constituting 1 slot need not necessarily be 14 symbols (For example, 28, 56 symbols). Furthermore, the number of slots per subframe may vary depending on the SCS.

Note that the time direction (t) shown in FIG. 3 may be referred to as a time domain, symbol period or symbol time. The frequency direction may also be referred to as a frequency domain, resource block, subcarrier or BWP (Bandwidth Part).

(2) Function Block Configuration of Radio Communication System

Next, the functional block configuration of radio communication system 10 will be described. Specifically, the functional block configuration of the UE 200 will be described.

Figure 4:
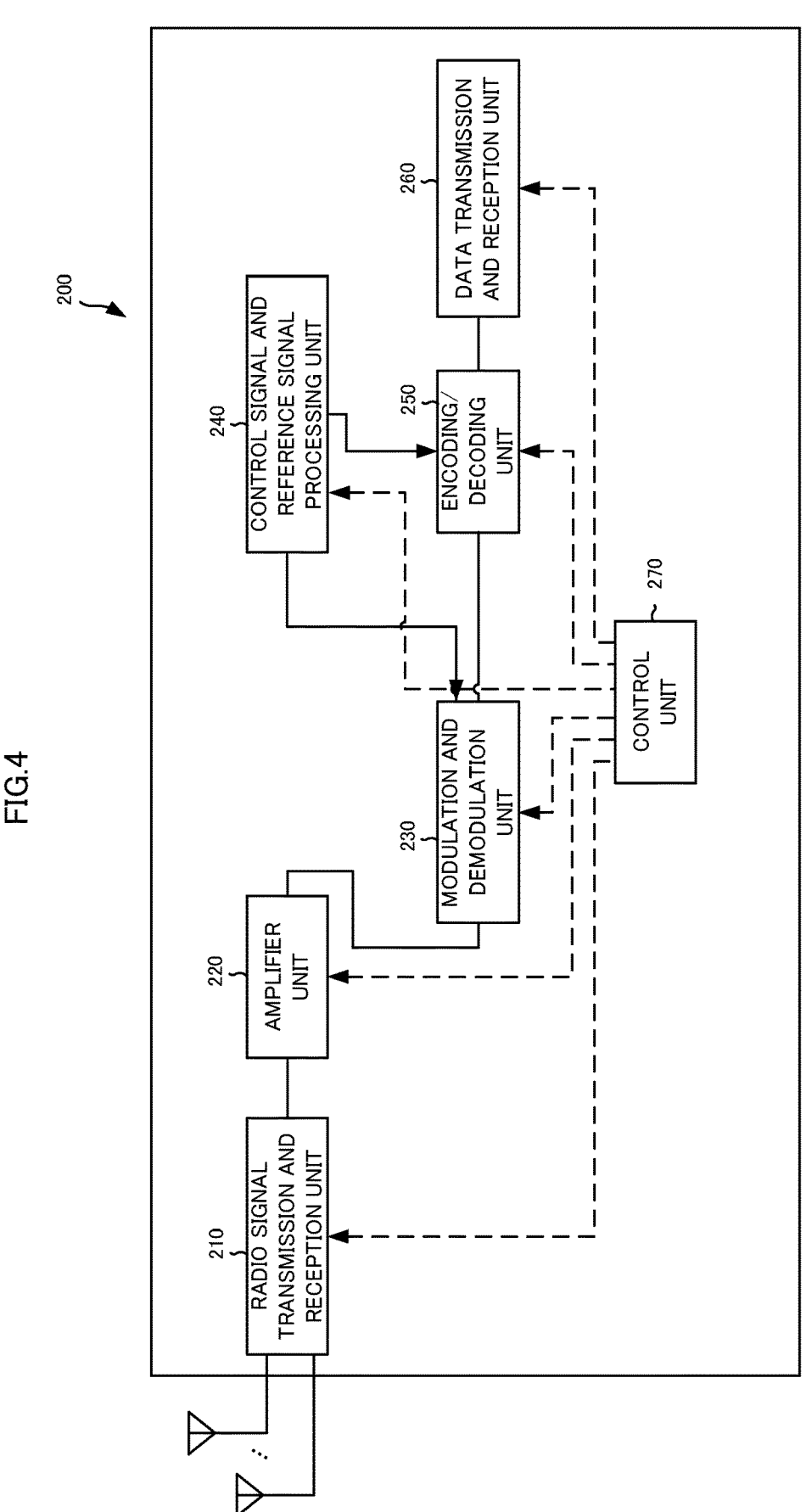
FIG. 4 is a functional block configuration diagram of the UE 200.

FIG. 4 is a functional block configuration diagram of the UE 200. As shown in FIG. 4, the UE 200 comprises a radio signal transmission and reception unit 210, an amplifier unit 220, a modulation and demodulation unit 230, a control signal and reference signal processing unit 240, an encoding/decoding unit 250, a data transmission and reception unit 260 and a control unit 270.

The radio signal transmission and reception unit 210 transmits and receives radio signals in accordance with NR. The radio signal transmission and reception unit 210 supports Massive MIMO, CA for bundling multiple CCs, and DC for simultaneously communicating between UE and each of the 2 NG-RAN nodes.

The amplifier unit 220 will consist of a Power Amplifier (PA), a Low Noise Amplifier (LNA) and other components. The amplifier unit 220 amplifies the signal output from the modulation and demodulation unit 230 to a predetermined power level. The amplifier unit 220 also amplifies the RF signal output from the radio signal transmission and reception unit 210.

The modulation and demodulation unit 230 performs data modulation/demodulation, transmission power setting and resource block allocation for each predetermined communication destination (gNB 100 or other gNB). On the modulation and demodulation unit 230, Cyclic Prefix-Orthogonal-Frequency Division Multiplexing (CP-OFDM)/Discrete Fourier Transform-Spread (DFT-S-OFDM) may be applied. DFT-S-OFDM may be used not only for the uplink (UL) but also for the downlink (DL).

The control signal and reference signal processing unit 240 performs processing for various control signals transmitted and received by the UE 200 and processing for various reference signals transmitted and received by the UE 200.

Specifically, the control signal and reference signal processing unit 240 receives various control signals transmitted from the gNB 100 via a predetermined control channel, such as control signals of a radio resource control layer (RRC). The control signal and reference signal processing unit 240 also transmits various control signals toward the gNB 100 via a predetermined control channel.

The control signal and reference signal processing unit 240 performs processing using a reference signal (RS) such as a Demodulation Reference Signal (DMRS) and a Phase Tracking Reference Signal (PTRS).

DMRS is a known reference signal (pilot signal) between individual base stations and terminals for estimating a fading channel used for data demodulation. PTRS is a reference signal for individual terminals for estimating phase noise, which is a problem in high frequency bands.

In addition to DMRS and PTRS, the reference signal may include Channel State Information-Reference Signal (CSI-RS), Sounding Reference Signal (SRS), and Positioning Reference Signal (PRS) for location information.

The channel also includes a control channel and a data channel. The control channels include PDCCH (Physical Downlink Control Channel), PUCCH (Physical Uplink Control Channel), RACH (Random Access Channel), Downlink Control Information (DCI) including Random Access Radio Network Temporary Identifier (RA-RNTI), and Physical Broadcast Channel (PBCH).

The data channels include PDSCH (Physical Downlink Shared Channel) and PUSCH (Physical Uplink Shared Channel). Data means data transmitted through a data channel. A data channel may be read as a shared channel.

In an embodiment, the control signal and reference signal processing unit 240 performs the transmission of an uplink signal using two or more uplink channels with different priorities. Two or more uplink channels with different priorities may be the uplink channels corresponding to two or more DCIs. The uplink channel includes a Physical Uplink Control Channel (PUCCH) and a Physical Uplink Shared Channel (PUSCH). The uplink signal may include Uplink Control Information (UCI). The UCI may include an acknowledgment (HARQ-ACK) for one or more TBs. The UCI may include a Scheduling Request (SR) that requests scheduling of resources, or a Channel State Information (CSI) that represents the state of the channel. The UCI may be transmitted via PUCCH or PUSCH.

For each predetermined destination (gNB 100 or other gNB), the encoding/decoding unit 250 performs data division/concatenation and channel coding/decoding, etc.

Specifically, the encoding/decoding unit 250 divides the data output from the data transmission and reception unit 260 into predetermined sizes and performs channel coding on the divided data. The encoding/decoding unit 250 also decodes the data output from the modulation and demodulation unit 230 and concatenates the decoded data.

The data transmission and reception unit 260 transmits and receives Protocol Data Units (PDU) and Service Data Units (SDU). Specifically, the data transmission and reception unit 260 performs assembly/disassembly of PDUs/SDUs in multiple layers (Media access control layer (MAC), radio link control layer (RLC), and packet data convergence protocol layer (PDCP), etc.). The data transmission and reception unit 260 also performs error correction and retransmission control of data based on a hybrid automatic repeat request (ARQ).

The control unit 270 controls each functional block that constitutes the UE 200. In particular, in an embodiment, the control unit 270 performs multiplexing control on multiplexing of two or more uplink channels when the multiplexing timeline condition on multiplexing of two or more uplink channels is satisfied. The control unit 270 performs prioritization control on prioritizing two or more uplink channels when the prioritizing timeline condition on prioritizing two or more uplink channels is satisfied. After determining whether the multiple timeline condition is satisfied, the control unit 270 determines whether the prioritizing timeline condition is satisfied. In the following, UCI is exemplified as an example of an uplink signal.

(3) Timeline

The timeline is described below. Specifically, the processing timeline for the processing time of the UE 200, the timeline for multiplexing control, and the timeline for priority control are described.

(3.1) Timeline for Processing Time

Figure 5:
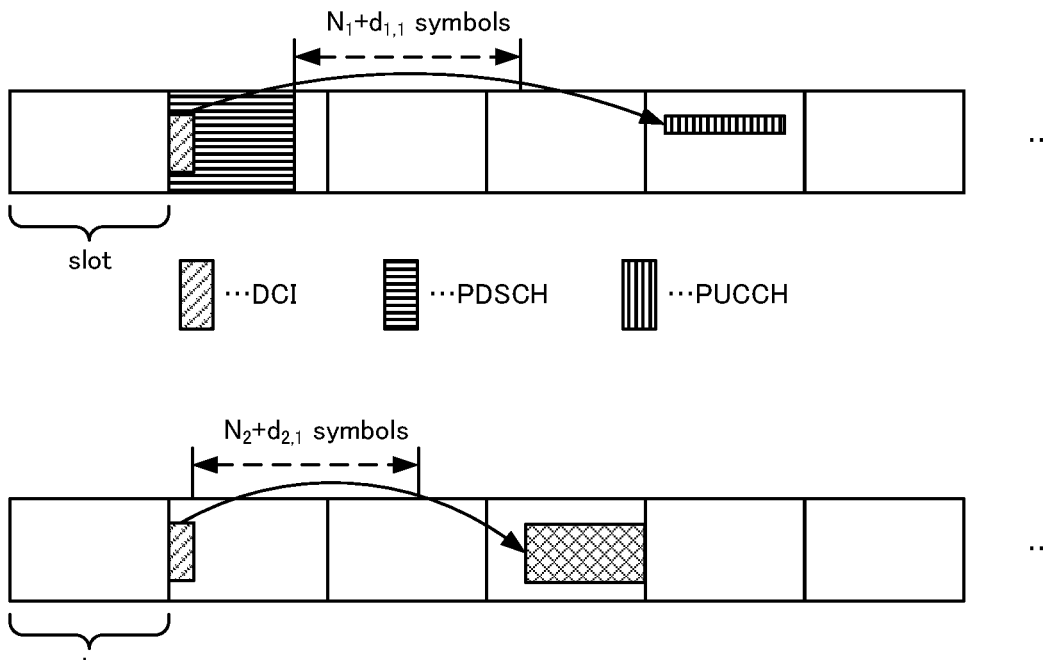
FIG. 5 is a diagram for explaining the processing timeline conditions.

First, a case of transmitting UCI via PUCCH will be described with reference to the upper row of FIG. 5. As shown in the upper row of FIG. 5, the UE 200 must not assume a case in which the time between the last symbol of PDSCH containing DCI and the first symbol of PUCCH does not exceed $N_1+d_{1,\,1}$ symbol. In other words, the processing timeline condition for the processing time of the UE 200 for PUCCH is that the time between the last symbol of PDSCH and the first symbol of PUCCH is greater than or equal to $N_1+d_{1,\,1}$ symbol. $N_1$ is a parameter determined according to the UE Capability and SCS of the UE 200, and $d_{1,\,1}$ is a parameter determined according to the UE Capability of the UE 200 and the Mapping type of the PDSCH, etc. (3GPP TS 38.214 V 16.3.0 § 5.3 "UE PDSCH processing procedure time").

Second, a case for transmitting UCI via PUSCH will be described with reference to the lower part of FIG. 5. As shown in the lower part of FIG. 5, the UE 200 must not assume a case in which the time between the last symbol of PDCCH containing DCI and the first symbol of PUSCH does not exceed $N_2+d_2$, 1 symbol. In other words, the processing timeline condition for the processing time of the UE 200 for PUSCH is that the time between the last symbol of PDCCH and the first symbol of PUSCH is greater than or equal to $N_2+d_2$, 1 symbol. $N_2$ is a parameter determined according to the UE Capability and SCS of the UE 200, and $d_{2,\,1}$ is a parameter determined according to whether or not the first symbol of PUSCH contains only DMRS (3GPP TS 38.214 V 16.3.0 section 6.4 "UE PUSCH preparation procedure time").

(3.2) Timeline on Multiplexing Control

Figure 6:
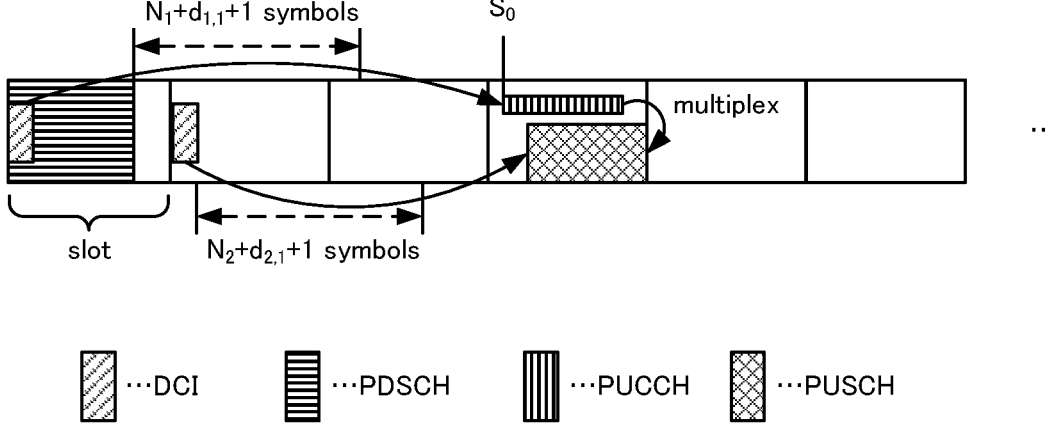
FIG. 6 is a diagram for explaining the multiple timeline conditions.

The multiplexing control of PUCCH and PUSCH in the same slot will be explained below with reference to FIG. 6. As shown in FIG. 6, the UE 200 must not assume the multiplexing of more than two uplink channels when the time between the last symbol of the PDSCH including the DCI and the first symbol of the foremost uplink channel (PUCCH) does not exceed $N_1+d_{1,1}+1$ symbols. The foremost uplink channel means the foremost uplink channel among the two or more uplink channels multiplexed in the same slot. The first symbol of the foremost uplink channel may be called the start position (first start position) of the foremost uplink channel. The first symbol of the foremost uplink channel may be called $S_0$. In other words, the multiple timeline condition for multiplexing two or more uplink channels is that the time between the last symbol of the PDSCH and the start position ($S_0$) of the foremost uplink channel is greater than or equal to $N_1+d_{1,1}+1$ symbols. $N_1+d_{1,1}+1$ is an example of a time threshold (first time threshold) that defines the multiple timeline condition.

Also, the UE 200 must not assume the multiplexing of two or more uplink channels when the time between the last symbol of the PDCCH containing the DCI and the start position of the earliest uplink channel ($S_0$) does not exceed $N_2+d_{2,1}+1$ symbols. In other words, the multiplexing timeline condition of two or more uplink channels is that the time between the last symbol of the PDCCH and the start position of the earliest uplink channel ($S_0$) is not less than $N_2+d_{2,1}+1$ symbols. $N_2+d_{2,1}+1$ is an example of a time threshold (first time threshold) that defines the multiplexing timeline condition.

UE 200 multiplexes PUCCH to PUSCH when the multiplexing timeline condition is satisfied. The UE 200 does not assume the case where the multiple timeline condition is not satisfied, but may not perform both PUCCH and PUSCH transmissions when the multiple timeline condition is not satisfied.

(3.3) Timeline on Priority Control

The priority control of PUCCH and PUSCH in the same slot will be described below with reference to FIG. 7.

Figure 7:
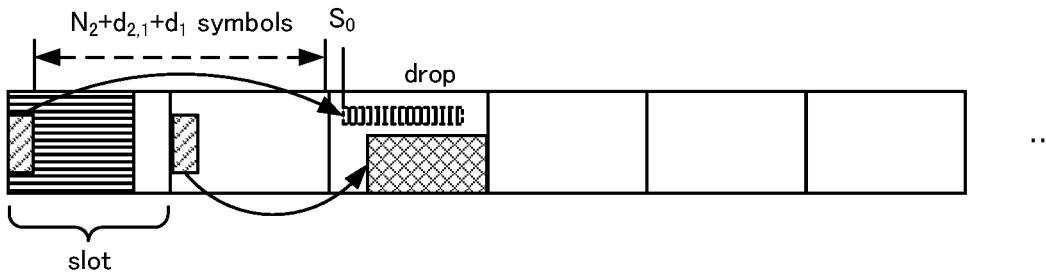
FIG. 7 is a diagram for explaining the prioritized timeline conditions.
Figure 7:
Figure 7:
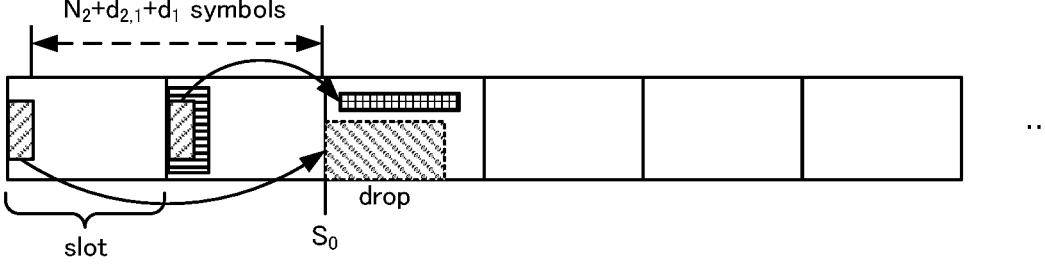
Figure 7:

As shown in the upper part of FIG. 7, the UE 200 must not assume the priority of more than two uplink channels when the time between the last symbol of the PDCCH containing the DCI and the first symbol of the foremost uplink channel (PUCCH) ($S_0$, described above) does not exceed $N_2+d_2$, $1+d_1$ symbols. In other words, the priority timing condition for the priority of more than two uplink channels is that the time between the last symbol of the PDCCH and the start position of the foremost uplink channel ($S_0$) is not less than $N_2+d_2$, $1+d_1$ symbols.

For example, if the priority timeline condition is satisfied, the UE 200 will not fail the PUCCH (LP; Low Priority) transmission of the UCI and will fail the PUSCH (HP; High Priority) transmission of the UCI. The UE 200 does not anticipate the case where the priority timeline condition is not met, but may not perform both PUCCH and PUSCH transmissions if the priority timeline condition is not met.

Similarly, as shown in the lower part of FIG. 7, the UE 200 must not assume the prioritization of more than two uplink channels when the time between the last symbol of the PDCCH containing the DCI and the first symbol of the foremost uplink channel (PUSCH) ($S_0$, described above) does not exceed $N_2+d_2$, $1+d_1$ symbols. In other words, the prioritization timing condition for the prioritization of more than two uplink channels is that the time between the last symbol of the PDCCH and the start position of the foremost uplink channel ($S_0$) is not less than $N_2+d_2$, $1+d_1$ symbols.

For example, if the prioritization timeline condition is satisfied, then the UE 200 can use the PUSCH (LP; Low Priority) instead of transmitting the UCI via PUCCH (HP; High Priority) to transmit UCI. The UE 200 does not anticipate the case where the priority timeline condition is not met, but may not perform both PUCCH and PUSCH transmissions if the priority timeline condition is not met.

(4) Problem

As a result of diligent study, the inventors found the possibility of the following problems in the case of performing multiplexing control and priority control on an uplink channel with different priorities, assuming the aforementioned timeline.

Figure 8:
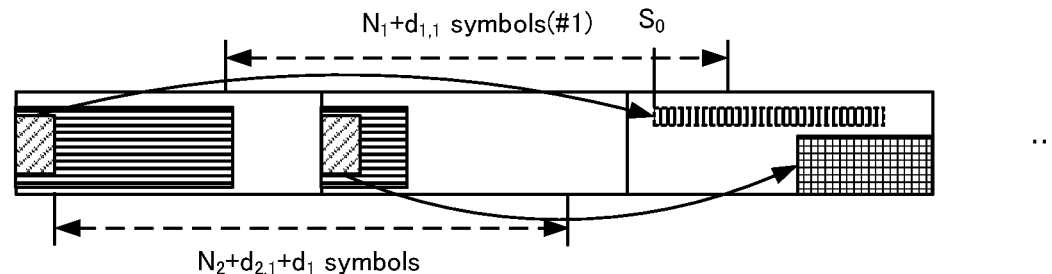
FIG. 8 is a diagram for explaining the issues.
Figure 8:
Figure 8:
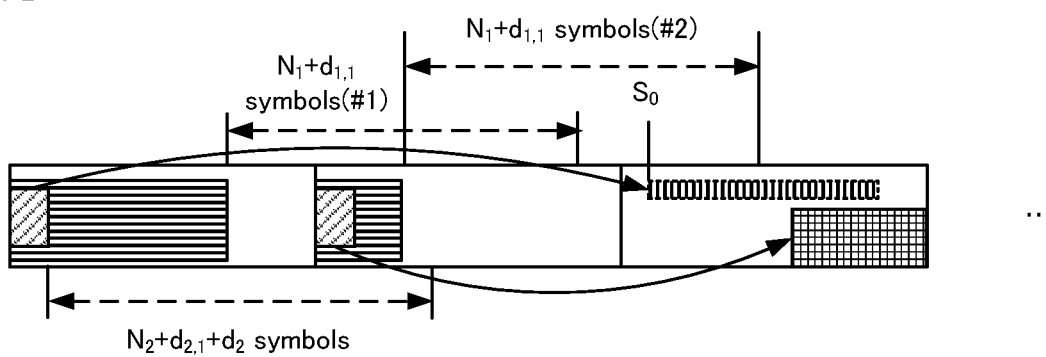
Figure 8:

First, let's talk about Case 1. As shown in the upper part of FIG. 8, when focusing on the first PUCCH (LP), the processing timeline condition is that the time between the last symbol of the PDSCH containing the DCI and the start position ($S_0$) of the earliest uplink channel (Here, PUCCH (LP)) is at least $N_1+d_{1,1}$ symbol (#1), and the priority timeline condition is that the time between the last symbol of the PDCCH containing the DCI and the start position ($S_0$) of the earliest uplink channel (Here, PUCCH (LP)) is at least $N_2+d_{2,1}+d_1$ symbol. However, while the time origin for determining whether the processing timeline condition is satisfied is the last symbol of the PDSCH, the time origin for determining whether the priority timeline condition is satisfied is the last symbol of the PDCCH. Therefore, it is conceivable that although the priority timeline condition ($N_2+d_{2,1}+d_1$ symbol) is satisfied, the processing timeline condition ($N_1+d_{1,1}$ symbol (#1)) of the first PUCCH (LP) is not satisfied. As described above, the operation of UE 200 in Case 1 is unclear because no case is assumed in which the processing timeline condition is not satisfied.

Second, Case 2 will be described. As shown in the lower part of FIG. 8, when focusing on the first PUCCH (LP), the processing timeline condition is that the time between the last symbol of the PDSCH containing the DCI and the start position ($S_0$) of the earliest uplink channel (Here, PUCCH (LP)) is at least $N_1+d_{1,1}$ symbol (#1), and the prioritization timeline condition is that the time between the last symbol of the PDCCH containing the DCI and the start position ($S_0$) of the earliest uplink channel (Here, PUCCH (LP)) is at least $N_2+d_{2,1}+d_1$ symbol. On the other hand, when focusing on the second PUCCH (HP), the processing timeline condition is that the time between the last symbol of the PDSCH containing the DCI and the start position ($S_0$) of the earliest uplink channel (Here, PUCCH (LP)) is at least $N_1+d_{1,1}$ symbol (#2). In such a case, although the priority timeline condition ($N_2+d_{2,1}+d_1$ symbol) and the processing timeline condition ($N_1+d_{1,1}$ symbol (#1)) of the first PUCCH (LP) are satisfied, it is conceivable that the processing timeline condition ($N_1+d_{1,1}$ symbol (#2)) of the second PUCCH (HP) is not satisfied. As described above, the operation of the UE 200 in Case 2 is unclear because no case is assumed in which the processing timeline conditions are not satisfied.

Figure 9:
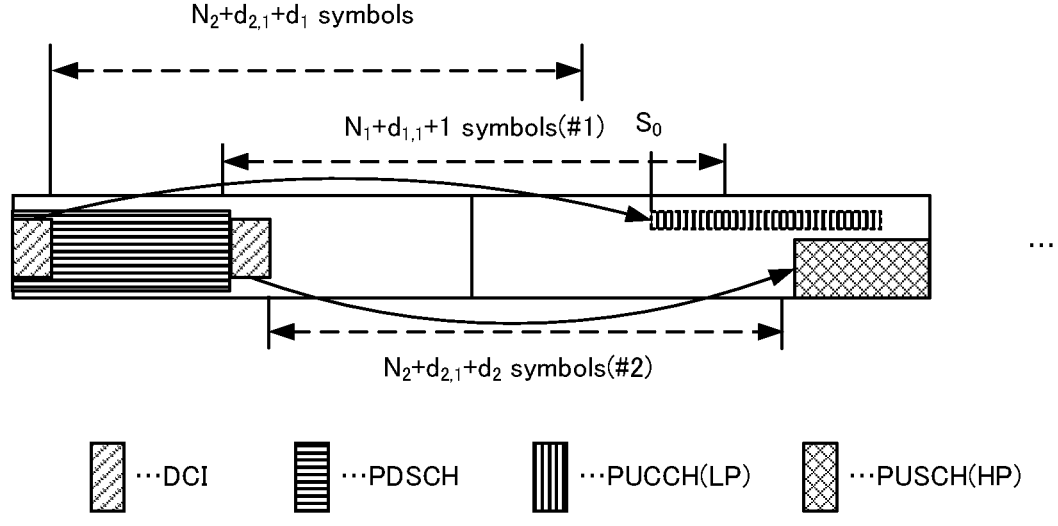
FIG. 9 is a diagram for explaining the issues.
Figure 9:
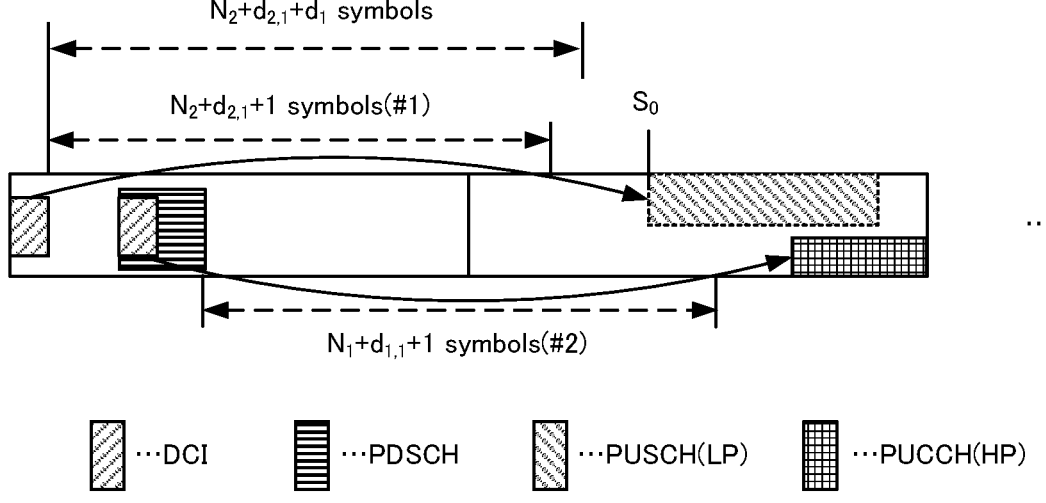

Third, Case 3 will be described. As shown in the upper part of FIG. 9, it is conceivable that although the priority timeline condition ($N_2+d_{2,1}+d_1$ symbol) is satisfied, the multiple timeline condition ($N_1+d_{1,1}+1$ symbol (#1)) of the first PUCCH (LP) is not satisfied. Similarly, it is conceivable that although the priority timeline condition ($N_2+d_{2,1}+d_1$ symbol) is satisfied, the multiple timeline condition ($N_2+d_{2,1}+1$ symbol (#2)) of the second PUSCH (HP) is not satisfied. As described above, the operation of UE 200 in Case 3 is unclear because the case in which the multiple timeline condition is not satisfied is not assumed.

Fourth, Case 4 is described. As shown in the upper part of FIG. 9, it is conceivable that although the priority timeline condition ($N_2+d_{2,1}+d_1$ symbol) and the multiple timeline condition ($N_2+d_{2,1}+1$ symbol (#1)) of the first PUSCH (LP) are satisfied, the multiple timeline condition ($N_1+d_{1,1}+1$ symbol (#2)) of the second PUCCH (HP) is not satisfied. As described above, the operation of UE 200 in Case 4 is unclear because the case in which the multiple timeline condition is not satisfied is not assumed.

(5) Control Example

As explained above in Case 1 to Case 4, there are cases where the processing timeline condition and the multiple timeline condition are not satisfied even if the priority timeline condition is satisfied. From this viewpoint, in the embodiment, the UE 200 (control unit 270) performs the following operations.

Specifically, the control unit 270 determines whether the priority timeline condition is satisfied after determining whether the multiple timeline condition is satisfied. That is, the control unit 270 performs multiplexing control of 2 or more uplink channels when the multiple timeline is satisfied. the control unit 270 performs priority control of 2 or more uplink channels when the multiple timeline is not satisfied and the priority timeline condition is satisfied. Under such a premise, the following mechanism may be introduced.

(5.1) Control Example 1

In Control example 1, a new parameter is introduced as a time threshold to define multiple timeline conditions. Specifically, the multiple timeline conditions include a first multiple timeline condition used in multiplexing control that is not based on the priority of two or more uplink channels and a second multiple timeline condition used in multiplexing control that is based on the priority of two or more uplink channels. The second time threshold defining the second multiple timeline condition is shorter than the first time threshold defining the first multiple timeline condition. Here, the first time threshold is an existing parameter and the second time threshold is an example of a new parameter.

Figure 10:
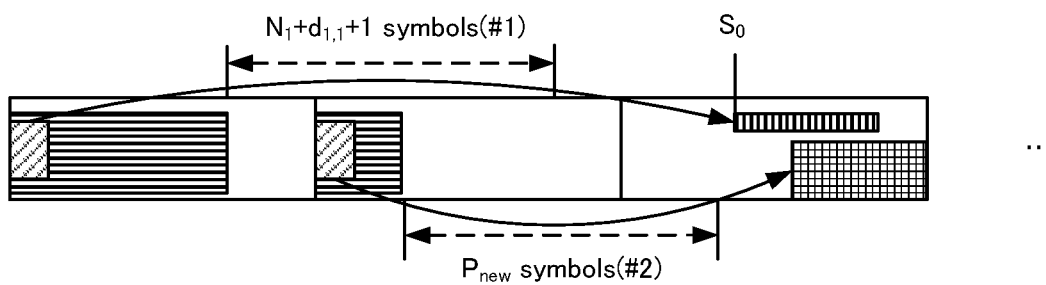
FIG. 10 is a diagram for explaining Control example 1.
Figure 10:
Figure 10:
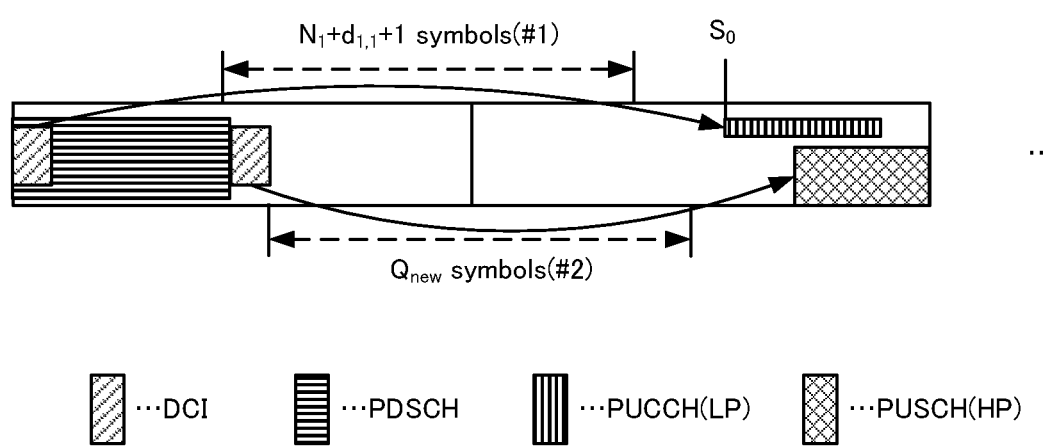

For example, as shown in Control example 1-1 in FIG. 10, a second time line condition may be introduced as a multiple time line condition for the second PUCCH (HP). For example, $P_{new}$ is introduced as a time threshold defining the second multiple time line condition. $P_{new}$ is a time shorter than the first time threshold $(N_1+d_{1,1}+1)$. $P_{new}$ may be $N_1+d_{1,1}$. $P_{new}$ may be greater than or equal to the time threshold defining the processing timeline condition. Although not specifically limited, for the first PUCCH (LP), the first time threshold $(N_1+d_{1,1}+1)$ may be applied. Alternatively, for the first PUCCH (LP), the second time threshold $(P_{new})$ may also be applied.

Similarly, as shown in Control example 1-2 in FIG. 10, the second time line condition may be introduced as a multiple time line condition for the second PUSCH. For example, $Q_{new}$ is introduced as a time threshold defining the second multiple time line condition. $Q_{new}$ is a time shorter than the first time threshold $(N_2+d_{2,1}+1)$. $Q_{new}$ may be $N_2+_{d2,1}$. $Q_{new}$ may be greater than or equal to the time threshold defining the processing timeline condition. Although not specifically limited, for the first PUCCH (LP), the first time threshold $(N_1+d_{1,1}+1)$ may be applied.

(5.2) Control Example 2

In Control example 2, a new interpretation or a new parameter is introduced for the start position of the uplink channel used in the multiple timeline condition. Specifically, the multiple timeline condition includes a first multiple timeline condition used in multiplexing control that is not based on the priority of the uplink signal and a second multiple timeline condition used in multiplexing control that is based on the priority of the uplink signal. The first start position of the uplink channel used in the first multiple timeline condition is the start position $(S_0)$ of the earliest uplink channel among two or more uplink channels that are multiplexed in multiplexing control. On the other hand, the second start position of the uplink channel used in the second multiple timeline condition is the start position $(S_{new})$ of the uplink channel with resources used in multiplexing control among two or more uplink channels that are multiplexed in multiplexing control. The second start position can be considered as an example of a new interpretation and an example of a new parameter. Here, the second multiple timeline condition may be defined such that the time threshold from the final symbol of PDCCH to $S_{new}$ (which may be referred to as the third time threshold) is longer than $N_1+d_{1,1}+x$ or $N_2+d_{2,1}+y$.

The uplink channel with resources used in multiplexing control means the second uplink channel in the case of multiplexing the first uplink channel to the second uplink channel. The priority of the second uplink channel may be higher than that of the first uplink channel.

Figure 11:
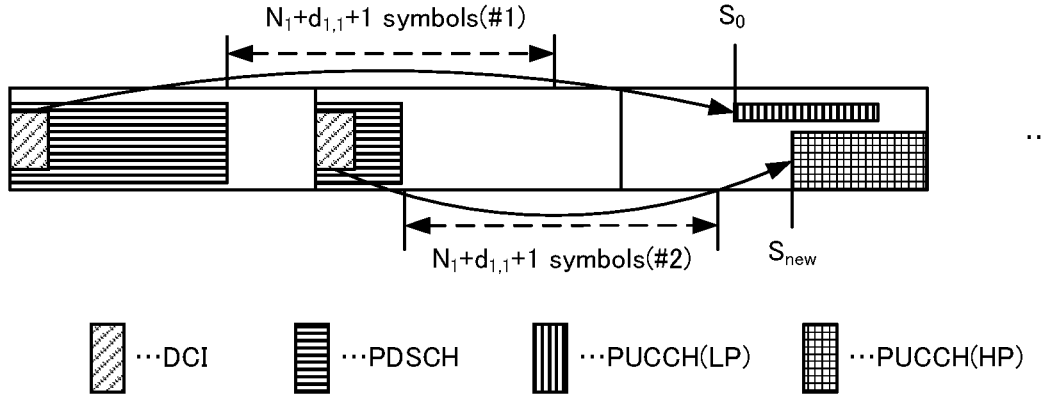
FIG. 11 is a diagram for explaining Control example 2.
Figure 11:
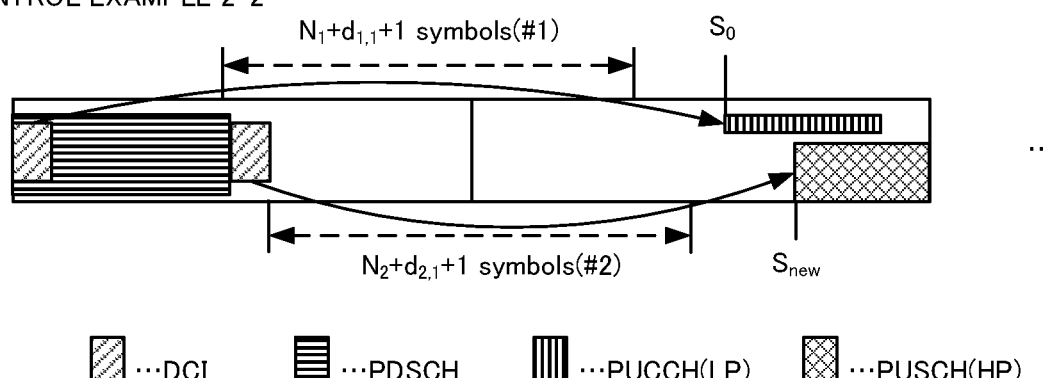
Figure 11:
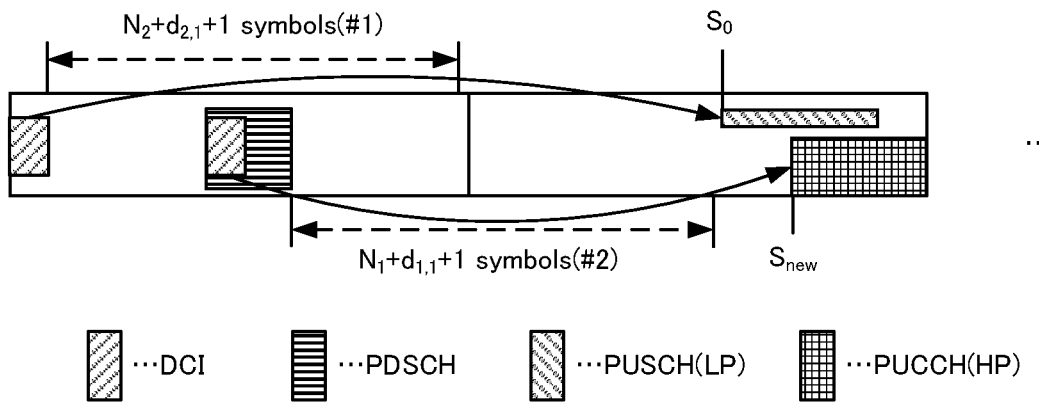

For example, as shown in Control example 2-1 in FIG. 11, the second timeline condition may be introduced as a multiple timeline condition for the second PUCCH (HP). The start position of the uplink channel used in the second multiple timeline condition is the start position $(S_{new})$ of the PUCCH (HP) with the resources used in the multiplexing control. Here, a case where PUCCH (LP) is multiplexed to PUCCH (HP) is exemplified.

Similarly, as shown in Control example 2-2 in FIG. 11, a second timeline condition may be introduced as a multiplexed timeline condition for the second PUSCH (HP). The start position of the uplink channel used in the second multiplexed timeline condition is the start position $(S_{new})$ of the PUSCH (HP) with the resources used in the multiplexed control. Here, a case where PUCCH (LP) is multiplexed to PUSCH (HP) is exemplified.

Similarly, as shown in Control example 2-3 in FIG. 11, a second timeline condition may be introduced as a multiple timeline condition for the second PUCCH (HP). The start position of the uplink channel used in the second multiple timeline condition is the start position $(S_{new})$ of the PUCCH (HP) with the resources used in the multiplexing control. Here, a case where PUSCH (LP) is multiplexed to PUCCH (HP) is exemplified.

As for the priority timeline condition, existing parameters (see FIG. 7) may be used. In addition, Control example 2 and Control example 3 may be combined.

(5.3) Control Example 3

In Control example 3, constraints are placed on the multiplexing of two or more uplink channels with different priorities. Specifically, the control unit 270 may perform multiplexing control when the starting positions of two or more uplink channels are aligned. The control unit 270 may perform priority control without performing multiplex control when the starting positions of 2 or more uplink channels are not aligned.

Figure 12:
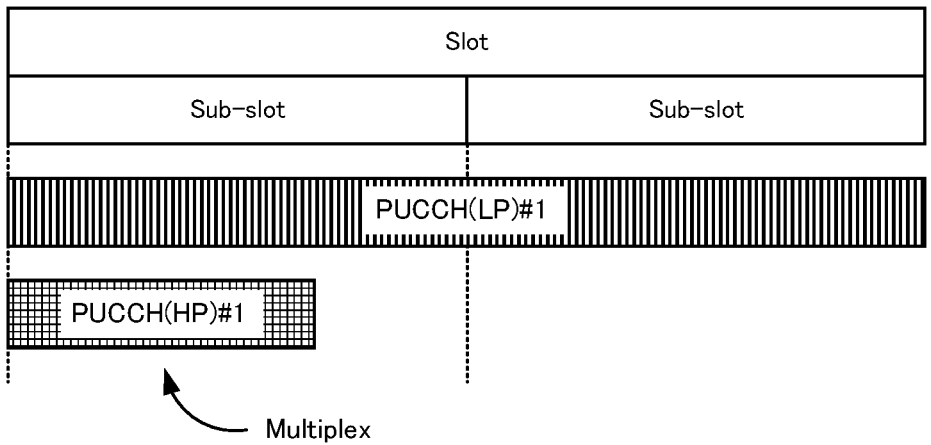
FIG. 12 is a diagram for explaining Control example 3.
Figure 12:
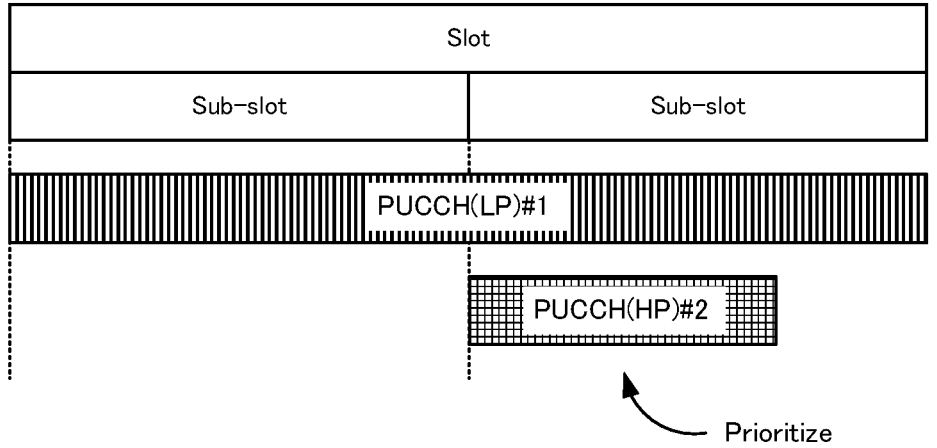

In the following, we consider a case where PUCCH (LP) is transmitted in units of slots and PUCCH (HP) is transmitted in units of subslots as shown in FIG. 12.

For example, as shown in Control example 3-1 in FIG. 12, the control unit 270 may multiplex PUCCH (LP) #1 with PUCCH (HP) #1 if the start position of the subslot containing the start position of PUCCH (HP) #1 coincides with the start position of the slot containing the start position of PUCCH (LP) #1. In other words, if PUCCH (LP) #1 and PUCCH (HP) #1 collide at the same boundary, the multiplex control of PUCCH (LP) #1 and PUCCH (HP) #1 may be performed. In the case where the starting positions of slots or subslots including the starting positions of two or more uplink channels coincide (That is, two or more uplink channels collide at the same boundary), it may be expressed that the starting positions of two or more uplink channels are aligned.

On the other hand, as shown in Control example 3-2 of FIG. 12, the control unit 270 may execute preferential control of PUCCH (LP) #1 and PUCCH (HP) #2 without multiplexing PUCCH (LP) #1 to PUCCH (HP) #2, when the starting position of the subslot including the starting position of PUCCH (HP) #2 does not coincide with the starting position of the slot including the starting position of PUCCH (LP) #1. In other words, if PUCCH (LP) #1 and PUCCH (HP) #2 do not collide at the same boundary, preferential control of PUCCH (LP) #1 and PUCCH (HP) #2 may be executed. For example, the control unit 270 may transmit PUCCH (HP) #2 without transmitting PUCCH (LP) #1. Note that a case in which the start positions of slots or subslots containing the start positions of two or more uplink channels do not match (That is, two or more uplink channels do not collide at the same boundary) may be expressed as a case in which the start positions of two or more uplink channels do not match.

(6) Example of Operation

An example of operation of the embodiment will be described below. In the following, a case where multiplexing control and priority control of 2 or more uplink channels with different priorities are set in the UE 200 will be illustrated.

Figure 13:
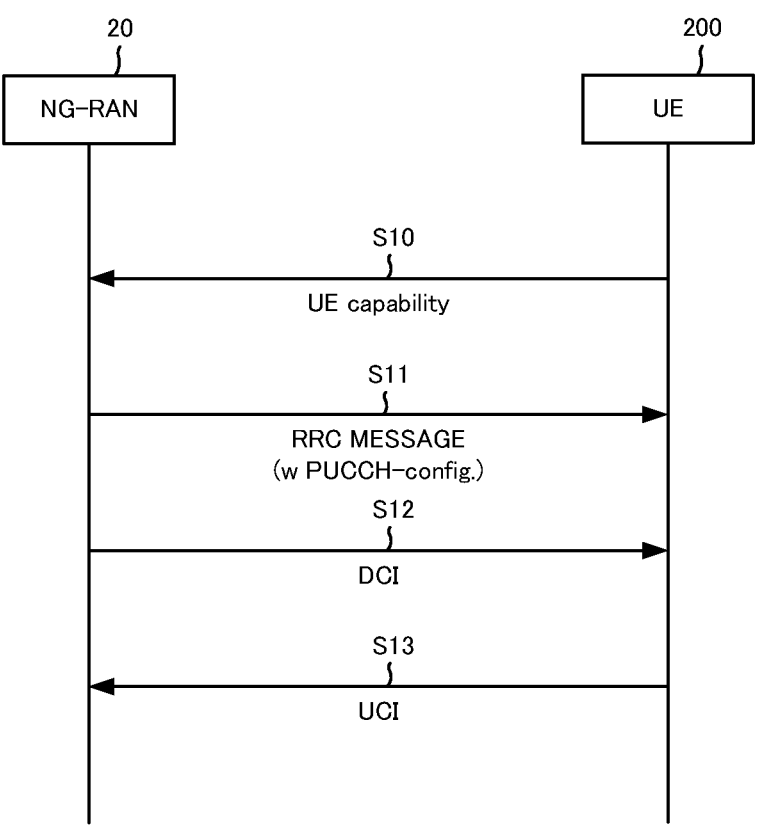
FIG. 13 is a diagram showing an example of operation.

As shown in FIG. 13, in step S10, the UE 200 transmits a message containing UE Capability to the NG-RAN 20. UE Capability may include an information element indicating whether it supports multiplexing control of 2 or more uplink channels with different priorities. UE Capability may include an information element indicating whether it supports priority control of 2 or more uplink channels with different priorities.

In step S11, the UE 100 receives from the NG-RAN 20 an RRC message containing the PUCCH-ConFig. associated with the multiple CCs. The PUCCH-ConFig. may contain an information element indicating whether or not to configure multiplexing control of 2 or more uplink channels with different priorities. The PUCCH-ConFig. may contain an information element indicating whether or not to configure priority control of 2 or more uplink channels with different priorities.

In step S12, the UE 200 receives 1 or more DCIs from the NG-RAN 20 via the PDCCH. The NG-RAN 20 may transmit a DCI based on the UE Capability received in step S10. In other words, the DCI may include an information element (For example, Frequency domain resource assignment, Time domain resource assignment) that specifies an uplink resource that considers the UE Capability.

In step S13, the UE 200 determines whether the prioritized timeline condition is satisfied after determining whether the multiple timeline condition is satisfied. The UE 200 multiplexes 2 or more uplink channels with different priorities in the same slot when the multiplexing timeline condition is satisfied. The UE 200 prioritizes 2 or more uplink channels with different priorities in the same slot when the prioritizing timeline condition is satisfied.

(7) Operational Effects

In an embodiment, the UE 200 determines whether the prioritizing timeline condition is satisfied after determining whether the multiplexing timeline condition is satisfied. With such a configuration, in a case where the prioritizing timeline condition is satisfied but the multiplexing timeline condition is satisfied (Case 3 and Case 4 shown in FIG. 9), it is possible to avoid a situation in which the operation of the UE 200 becomes unclear, and appropriate control regarding multiplexing and prioritization can be performed.

In the embodiment, a new parameter (second time threshold) is introduced as a time threshold defining the multiplexing timeline condition, and the second time threshold is shorter than the first time threshold. With such a configuration, the multiplically-required delay of two or more uplink channels with different priorities is reduced.

In the embodiment, a new interpretation or a new parameter (second start position) is introduced for the start position of the uplink channel used in the multiple timeline condition. The second start position is the start position of the uplink channel with resources used in the multiplexing control. With such a configuration, the multiplexing control can be properly executed without affecting the processing associated with the multiplexing control.

Other Embodiments

Although the contents of the present invention have been described above in accordance with the embodiment, the present invention is not limited to these descriptions, and it is obvious to those skilled in the art that various modifications and improvements are possible.

In the above disclosure, UCI was exemplified as an example of an uplink signal. However, the above disclosure is not limited to this. The uplink signal may include a data signal. That is, the disclosure described above only needs to be provided for multiplexing and prioritizing two or more uplink channels with different priorities.

The disclosure described above exemplifies Case 1 to Case 4 as an issue, but the disclosure described above is not limited to this. The disclosure described above is applicable to cases where the preferred timeline condition is met but the multiple timeline condition is not.

The disclosure described above described the multiple timeline condition, but the disclosure described above is not limited to this. The disclosure described above is applicable to cases where the preferred timeline condition is met but the processing timeline condition is not. In such cases, the statement regarding multiple timelines may be replaced by the statement regarding processing timelines. For example, the UE 200 may determine whether the priority timeline condition is satisfied after determining whether the processing timeline condition is satisfied.

Although not specifically mentioned in the above disclosure, multiplexing control and priority control may be performed as follows: For example, PUCCH priority for HARQ-ACK may be higher than PUCCH priority for SR. In such cases, PUCCH for SR may be multiplexed to PUCCH for HARQ-ACK. If such multiplexing is not possible, PUCCH for HARQ-ACK may be sent without PUCCH for SR. PUCCH priority for URLLC (Ultra Reliable and Low Latency Communications) may be higher than PUSCH priority for eMBB (enhanced Mobile Broadband). In such cases, PUCCH for URLLC may be sent without PUSCH for eMBB.

While the above disclosure primarily described UCI, the above disclosure is not limited to this. UCI may be read as HARQ-ACK, SR, or CSI. A UCI that can be transmitted using multiple CCs may be any parameter selected from HARQ-ACK, SR, and CSI.

The block diagram (FIG. 4) used in the description of the above embodiment shows a block of functional units. Those functional blocks (structural components) can be realized by a desired combination of at least one of hardware and software. Means for realizing each functional block is not particularly limited. That is, each functional block may be realized using one physically or logically coupled device, or two or more physically or logically separated devices may be directly or indirectly connected (For example, using wired, wireless, etc.) and realized using these multiple devices. The functional block may be realized by combining the software with the one device or the multiple devices.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that makes transmission work is called a transmission unit (transmitting unit) or transmitter. In either case, as described above, the implementation method is not particularly limited.

Figure 14:
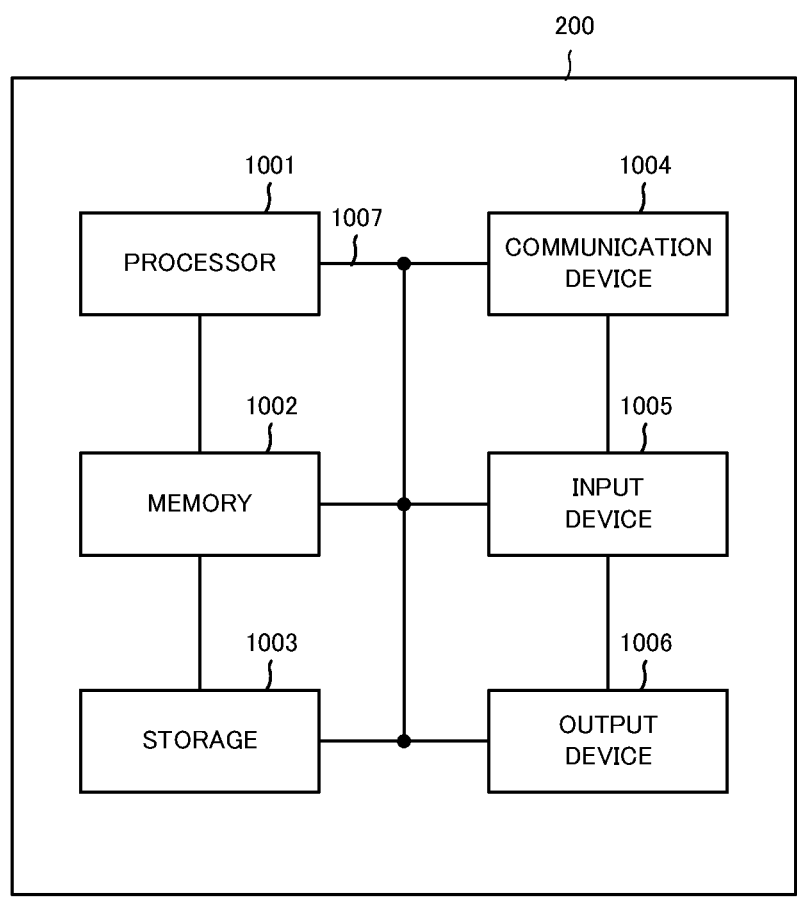
FIG. 14 is a diagram showing an example of the hardware configuration of the UE 200.

In addition, the aforementioned UE 200 (the device) may function as a computer that performs processing of the radio communication method of this disclosure. FIG. 14 shows an example of the hardware configuration of the device. As shown in FIG. 14, the device may be configured as a computer device including a processor 1001, a memory 1002, a storage 1003, an communication device 1004, an input device 1005, an output device 1006, a bus 1007, etc.

Furthermore, in the following explanation, the term "device" can be replaced with a circuit, device, unit, and the like. The hardware configuration of the device may be configured to include one or more of each device shown in the figure, or it may be configured without some devices.

Each functional block of the device (see FIG. 4) is realized by any hardware element of the computer device, or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001, for example, operates an operating system to control the entire computer. The processor 1001 may consist of a central processing unit (CPU) including interfaces with peripheral devices, controllers, arithmetic units, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Furthermore, the various processes described above may be performed by one processor 1001 or simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EE-PROM), Random Access Memory (RAM), and the like. Memory 1002 may be referred to as a register, cache, main memory, etc. Memory 1002 may store programs (program code), software modules, etc., that are capable of executing a method according to one embodiment of this disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device such as a processor 1001 and a memory 1002 is connected by a bus 1007 for communicating information. The bus 1007 may be configured using a single bus or different buses for each device.

In addition, the device may include hardware such as a microprocessor, a digital signal processor (DSP), an application specific integrated circuit (ASIC), a programmable logic device (PLD), or a field programmable gate array (FPGA), with which some or all of the functional blocks may be implemented. For example, the processor 1001 may be implemented by using at least one of these hardware.

Also, the notification of information is not limited to the mode/embodiment described in this disclosure and may be made using other methods. For example, the notification of information may be carried out by physical layer signaling (e.g., Downlink Control Information (DCI), Uplink Control Information (UCI), higher layer signaling (e.g., RRC signaling, Medium Access Control (MAC) signaling, notification information (Master Information Block (MIB), System Information Block (SIB)), other signals or a combination thereof. The RRC signaling may also be referred to as an RRC message, e.g., an RRC Connection Setup message, an RRC Connection Reconfiguration message, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, etc., of each mode/embodiment described in this disclosure may be reordered as long as there is no conflict. For example, the method described in this disclosure uses an illustrative order to present elements of various steps and is not limited to the specific order presented.

The specific operation that is performed by the base station in the present disclosure may be performed by its upper node in some cases. In a network consisting of one or more network nodes with base stations, it is clear that various operations performed for communication with terminals can be performed by the base station and at least one of the other network nodes (For example, but not limited to MME or S-GW) other than the base station. In the above, an example in which there is one network node other than the base station is explained; however, a combination of a plurality of other network nodes (for example, MME and S-GW) may be used.

Information, signals (information, etc.) can be output from an upper layer (or lower layer) to a lower layer (or upper layer). It may be input and output via a plurality of network nodes.

The input/output information can be stored in a specific location (for example, a memory) or can be managed in a management table. Information that is input or output may be overwritten, updated, or appended. The information can be deleted after outputting. The inputted information can be transmitted to another device.

Decisions may be made by a value represented by a single bit (0 or 1), by a truth value (Boolean: true or false), or by comparing numbers (For example, a comparison with a given value).

Each aspect/embodiment described in this disclosure may be used alone, in combination, or switched as execution proceeds. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, if the software is transmitted from a website, server, or other remote source using at least one of wired technology (Coaxial cable, fiber optic cable, twisted pair, Digital subscriber Line (DSL), etc.) and wireless technology (Infrared, microwave, etc.), at least one of these wired and wireless technologies is included within the definition of a transmission medium.

Information, signals, or the like mentioned above may be represented by using any of a variety of different technologies. For example, data, instructions, commands, information, signals, bits, symbols, chips, etc. that may be referred to throughout the above description may be represented by voltage, current, electromagnetic wave, magnetic field or magnetic particle, light field or photon, or any combination thereof.

It should be noted that the terms described in this disclosure and those terms necessary for the understanding of this disclosure may be replaced with terms having the same or similar meanings. For example, at least one of the channels and symbols may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

A base station can house one or more (For example, three) cells, also called sectors. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a base station performing communication services in this coverage and to part or all of the coverage area of at least one of the base station subsystems.

In the present disclosure, the terms "mobile station (Mobile Station: MS)," "user terminal," "user equipment (User Equipment: UE)," "terminal" and the like can be used interchangeably.

A mobile station may be referred to by those skilled in the art as a subscriber station, mobile unit, subscriber unit, wireless unit, remote unit, mobile device, radio communication device, remote device, mobile subscriber station, access terminal, mobile terminal, wireless terminal, remote terminal, handset, user agent, mobile client, client, or some other appropriate term.

At least one of a base station and a mobile station may be called a transmitting device, a receiving device, a communication device, or the like. Note that, at least one of a base station and a mobile station may be a device mounted on a moving body, a moving body itself, or the like. The mobile may be a vehicle (For example, cars, airplanes, etc.), an unattended mobile (For example, drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in this disclosure may also be read as a mobile station (user terminal, hereinafter the same). For example, each mode/embodiment of this disclosure may be applied to a configuration in which communication between a base station and a mobile station is replaced with communication between multiple mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, mobile stations in this disclosure may be replaced with base stations. In this case, the base station may have the function of the mobile station.

A radio frame may consist of one or more frames in the time domain. Each one or more frames in the time domain may be referred to as a subframe.

A subframe may further consist of one or more slots in the time domain. A subframe may have a fixed length of time (For example, 1 ms) independent of numerology.

Numerology may be a communication parameter applied to at least one of the transmission and reception of a signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

Slots may consist of one or more symbols (Orthologous Frequency Division Multiplexing (OFDM)) symbols, Single Carrier Frequency Division Multiple Access (SC-FDMA) symbols, etc., in the time domain. A slot may be a unit of time based on the numerology.

A slot may include a plurality of minislots. Each minislot may consist of one or more symbols in the time domain. A minislot may also be called a subslot. A minislot may be composed of fewer symbols than slots. A PDSCH (or PUSCH) transmitted in units of time larger than the minislot may be referred to as a PDSCH (or PUSCH) mapping type A. A PDSCH (or PUSCH) transmitted using the minislot may be referred to as a PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be referred to as a transmission time interval (TTI), multiple consecutive subframes may be referred to as TTI, or one slot or one minislot may be referred to as TTI. That is, at least one of the subframes and TTI may be a subframe (1 ms) in an existing LTE, may have a duration shorter than 1 ms (For example, 1-13 symbols), or may have a duration longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

If one slot or one minislot is called a TTI, one or more TTIs (That is, one or more slots or one or more minislots) may be the minimum unit of time for scheduling. In addition, the number of slots (number of minislots) constituting the minimum unit of time for scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTIs that are usually shorter than TTI may be called shortened TTI, short TTI, partial or fractional TTI, shortened subframe, short subframe, minislot, subslot, slot, etc.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

A resource block (RB) is a unit of resource allocation in the time and frequency domains and may include one or more consecutive subcarriers in the frequency domain. The number of subcarriers included in RB may be, for example, twelve, and the same regardless of the topology. The number of subcarriers included in the RB may be determined based on the neurology.

The time domain of the RB may also include one or more symbols and may be one slot, one minislot, one subframe, or one TTI long. One TTI, one subframe, and the like may each consist of one or more resource blocks.

One or more RBs may be referred to as Physical RB (PRB), Sub-Carrier Group (SCG), Resource Element Group (REG), PRB pair, RB pair, and the like.

A resource block may also be composed of one or more Resource Elements (RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be identified by an index of RBs relative to the common reference point of the carrier. PRB may be defined in BWP and numbered within that BWP.

BWP may include UL BWP (UL BWP) and DL BWP (DL BWP). For a UE, one or more BWPs may be set within a carrier.

At least one of the configured BWPs may be active, and the UE may not expect to transmit and receive certain signals/channels outside the active BWP. Note that "cell," "carrier," and the like in this disclosure may be read as "BWP."

The above-described structures such as a radio frame, subframe, slot, minislot, and symbol are merely examples. For example, configurations such as the number of subframes contained in a radio frame, the number of subframes or slots per radio frame, the number of minislots contained in a slot, the number of symbols and RBs contained in a slot or minislot, the number of subcarriers contained in an RB, and the number of symbols, symbol length, and Cyclic Prefix (CP) length in a TTI can be varied variably.

The terms "connected," "coupled" or any variation thereof mean any connection or combination, directly or indirectly, between two or more elements and may include the presence of one or more intermediate elements between two elements that are "connected" or "coupled" to each other. The connection or connection between elements may be physical, logical or a combination thereof. For example, "connection" may be read as "access." As used in this disclosure, two elements may be considered to be "connected" or "coupled" to each other using at least one of one or more wire, cable and printed electrical connections and, as a few non-limiting and non-comprehensive examples, electromagnetic energy with wavelengths in the radio frequency domain, the microwave domain and the optical (both visible and invisible) domain.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to elements using designations such as "first" or "second" as used in this disclosure does not generally limit the amount or order of those elements. Such designations can be used in the present disclosure as a convenient way to distinguish between two or more elements. Thus, references to the first and second elements do not imply that only two elements can be adopted there or that the first element must in some way precede the second element.

In the present disclosure, the used terms "include," "including," and variants thereof are intended to be inclusive in a manner similar to the term "comprising." Furthermore, the term "or (or)" as used in this disclosure is not intended to be an exclusive OR.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or "determination" may include regarding some action as "judgment" or "determination." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS 10 radio communication system
20 NG-RAN
100 gNB
200 UE
210 radio signal transmission and reception unit
220 amplifier unit
230 modulation and demodulation unit
240 control signal and reference signal processing unit
250 encoding/decoding unit
260 data transmission and reception unit
270 control unit
1001 processor
1002 memory
1003 storage 1004 communication device
1005 input device
1006 output device
1007 bus

The invention claimed is:

1. A terminal comprising:
a transmitter that performs a transmission of an uplink signal using an uplink channel; and
a processor that performs a multiplexing control on a multiplexing of two or more uplink channels having different priorities when receiving an information element to configure the multiplexing control and when satisfying a multiplexing timeline condition on the multiplexing of the two or more uplink channels,
wherein the processor performs a prioritization control on a prioritization of the two or more uplink channels when not receiving the information element and when satisfying a prioritization timeline condition on the prioritization of the two or more uplink channels.

2. A base station comprising:
a receiver that performs a reception of an uplink signal using an uplink channel; and
a processor that indicates to perform a multiplexing control on a multiplexing of two or more uplink channels having different priorities when satisfying a multiplexing timeline condition on the multiplexing of the two or more uplink channels, by transmitting an information element to configure the multiplexing control,
wherein the processor indicates to perform a prioritization control on a prioritization of the two or more uplink channels when satisfying a prioritization timeline condition on the prioritization of the two or more uplink channels, by not transmitting the information element.

3. A radio communication system comprising:
a terminal; and
a base station, wherein
the terminal comprises:
a transmitter that performs a transmission of an uplink signal using an uplink channel; and
a terminal-side processor that performs a multiplexing control on a multiplexing of two or more uplink channels having different priorities when receiving an information element to configure the multiplexing control and when satisfying a multiplexing timeline condition on the multiplexing of the two or more uplink channels,
wherein the terminal-side processor performs a prioritization control on a prioritization of the two or more uplink channels when not receiving the information element and when satisfying a prioritization timeline condition on the prioritization of the two or more uplink channels, and
the base station comprises:
a base station-side processor that indicates to perform the multiplexing control when satisfying the multiplexing timeline condition, by transmitting the information element,
wherein the base station-side processor indicates to perform the prioritization control when satisfying the prioritization timeline condition, by not transmitting the information element.

4. A radio communication method performed by a terminal comprising:
performing a transmission of an uplink signal using an uplink channel;
performing a multiplexing control on a multiplexing of two or more uplink channels having different priorities when receiving an information element to configure the multiplexing control and when satisfying a multiplexing timeline condition on the multiplexing of the two or more uplink channels; and performing a prioritization control on a prioritization of the two or more uplink channels when not receiving the information element and when satisfying a prioritization timeline condition on the prioritization of the two or more uplink channels.

\*    \*    \*    \*    \*